United States Patent
Kenny et al.

(10) Patent No.: US 11,659,254 B1
(45) Date of Patent: *May 23, 2023

(54) COPYRIGHT COMPLIANT TRICK PLAYBACK MODES IN A SERVICE PROVIDER NETWORK

(71) Applicant: CSC Holdings, LLC, Bethpage, NY (US)

(72) Inventors: John Kenny, Lake Grove, NY (US); Peter Caramanica, Westbury, NY (US); John Markowski, Smithtown, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,806

(22) Filed: Mar. 21, 2022

Related U.S. Application Data (63) Continuation of application No. 17/186,475, filed on Feb. 26, 2021, now Pat. No. 11,284,165.

(51) Int. Cl.
  *H04N 21/6587* (2011.01)
  *H04N 21/231* (2011.01)
  *H04N 21/6408* (2011.01)

(52) U.S. Cl.
  CPC ... *H04N 21/6587* (2013.01); *H04N 21/23113* (2013.01); *H04N 21/6408* (2013.01)

(58) Field of Classification Search
  CPC ......... H04N 21/6587; H04N 21/23113; H04N 21/6408
  See application file for complete search history.

(56) References Cited

U.S. PATENT DOCUMENTS 5,440,334 A * 8/1995 Walters .............. H04N 7/17318
                                                        348/E7.071
5,550,577 A * 8/1996 Verbiest ............. H04N 7/17336
                                                        348/E7.075

(Continued)

FOREIGN PATENT DOCUMENTS

AU     2008275579 A1    1/2009
EP      0 757 487 B1    6/2000

(Continued)

OTHER PUBLICATIONS

Yeldell, C, "Scripps, Amazon.com Make Unbox Agreement; Deal Will Allows Shoppers to Access Network's Programs With Digital Video Download," printed from http://www.redorbit.com/modules/news/tools.php?tool=print&id=776909, 2 pages, Feb. 7, 2007.

(Continued)

*Primary Examiner* — Michael B. Pierorazio
(74) *Attorney, Agent, or Firm* — Sterne, Kessler, Goldstein & Fox P.L.L.C.

(57) ABSTRACT

A service provider network can enable subscriber of a service with capabilities of performing one or more trick playback modes, such as pause, play, stop, fast-forward, and/or rewind to provide some examples, on media content provided by a service provider network that is being presently viewed by one or more subscribers while abiding by current copyright laws. The service provider network can broadcast the media content to a subscriber device that is associated with the subscriber and can simultaneously store an exclusive copy of the media content being displayed by the subscriber device. And, the systems, methods, and apparatuses can time-shift the exclusive copy of the media content in accordance with the one or more trick playback modes and can unicast the time-shifted copy of the media (Continued)

content to the subscriber device to perform the one or more trick playback modes.

20 Claims, 4 Drawing Sheets

(56)                References Cited

U.S. PATENT DOCUMENTS

| | | | |
|---|---|---|---|
| 5,568,181 A * | 10/1996 | Greenwood | H04N 21/222 |
| | | | 725/95 |
| 5,720,037 A * | 2/1998 | Biliris | H04N 7/17336 |
| | | | 709/219 |
| 5,721,829 A | 2/1998 | Dunn et al. | |
| 6,002,720 A * | 12/1999 | Yurt | H04N 21/234381 |
| | | | 348/E7.071 |
| 6,151,444 A | 11/2000 | Abecassis | |
| 6,182,128 B1 * | 1/2001 | Kelkar | H04N 21/439 |
| | | | 348/E7.071 |
| 6,233,389 B1 * | 5/2001 | Barton | H04N 21/4344 |
| | | | 386/E5.07 |
| 6,801,947 B1 * | 10/2004 | Li | H04N 7/17327 |
| | | | 725/87 |
| 6,963,590 B1 | 11/2005 | Mann et al. | |
| 6,985,932 B1 * | 1/2006 | Glaser | H04H 20/82 |
| | | | 709/219 |
| 7,000,242 B1 * | 2/2006 | Haber | G06Q 40/12 |
| | | | 725/43 |
| 7,080,400 B1 * | 7/2006 | Navar | H04N 7/17336 |
| | | | 725/86 |
| 7,325,245 B1 * | 1/2008 | Clapper | H04N 21/858 |
| | | | 725/54 |
| 7,624,412 B2 * | 11/2009 | McEvilly | H04N 21/2668 |
| | | | 725/39 |
| 7,802,275 B1 | 9/2010 | Fernandez et al. | |
| 8,132,221 B2 | 3/2012 | Malik | |
| 8,732,776 B2 * | 5/2014 | Youssefmir | H04N 21/25808 |
| | | | 709/221 |
| 8,782,285 B1 | 7/2014 | Cassidy et al. | |
| 8,997,136 B2 * | 3/2015 | Brooks | H04N 21/6125 |
| | | | 725/31 |
| 9,077,667 B2 | 7/2015 | Sridhar | |
| 9,369,723 B2 | 6/2016 | Syed | |
| 9,473,548 B1 | 10/2016 | Chakrovorthy et al. | |
| 9,571,782 B2 * | 2/2017 | Rutledge | H04N 21/44204 |
| 9,819,984 B1 * | 11/2017 | Neill | H04N 21/6118 |
| 9,955,203 B2 * | 4/2018 | Phillips | H04N 21/2393 |
| 10,158,913 B1 | 12/2018 | Rutledge | |
| 10,178,425 B1 * | 1/2019 | Neill | H04N 21/23109 |
| 10,638,184 B2 * | 4/2020 | Phillips | H04N 21/8456 |
| 10,904,329 B1 | 1/2021 | Wartski et al. | |
| 10,986,390 B2 * | 4/2021 | Phillips | H04N 21/26258 |
| 11,064,239 B1 | 7/2021 | Neill et al. | |
| 11,122,330 B1 | 9/2021 | Rutledge | |
| 11,175,434 B2 | 11/2021 | Laverne | |
| 11,284,165 B1 | 3/2022 | Kenny et al. | |
| 2001/0043616 A1 | 11/2001 | Hild et al. | |
| 2002/0026645 A1 | 2/2002 | Son et al. | |
| 2002/0069405 A1 * | 6/2002 | Chapin | H04N 21/812 |
| | | | 725/135 |
| 2002/0076195 A1 * | 6/2002 | Nakajima | H04N 21/426 |
| | | | 348/E5.108 |
| 2002/0094025 A1 | 7/2002 | Hanamura et al. | |
| 2002/0138844 A1 * | 9/2002 | Otenasek | H04N 21/4622 |
| | | | 345/530 |
| 2002/0174147 A1 | 11/2002 | Wang et al. | |
| 2003/0044170 A1 * | 3/2003 | Haddad | H04N 5/76 |
| | | | 386/241 |
| 2003/0070182 A1 * | 4/2003 | Pierre | H04N 21/4325 |
| | | | 725/135 |
| 2003/0097659 A1 * | 5/2003 | Goldman | H04N 21/442 |
| | | | 725/89 |
| 2003/0113027 A1 | 6/2003 | Chan et al. | |
| 2003/0149988 A1 * | 8/2003 | Ellis | H04N 21/2335 |
| | | | 725/62 |
| 2003/0169813 A1 | 9/2003 | Van Der Schaar | |
| 2003/0177247 A1 | 9/2003 | Dunning et al. | |
| 2003/0208765 A1 * | 11/2003 | Urdang | H04N 21/8545 |
| | | | 348/E7.071 |
| 2003/0208767 A1 * | 11/2003 | Williamson | H04N 21/4325 |
| | | | 348/E7.071 |
| 2003/0233663 A1 | 12/2003 | Rao et al. | |
| 2004/0006698 A1 * | 1/2004 | Apfelbaum | G11B 19/00 |
| 2004/0057449 A1 | 3/2004 | Black | |
| 2004/0098463 A1 | 5/2004 | Shen et al. | |
| 2004/0133923 A1 * | 7/2004 | Watson | H04N 5/76 |
| | | | 348/E7.071 |
| 2004/0187164 A1 * | 9/2004 | Kandasamy | H04N 21/4227 |
| | | | 725/132 |
| 2004/0193648 A1 | 9/2004 | Lai et al. | |
| 2004/0194146 A1 * | 9/2004 | Bates | H04N 21/4396 |
| | | | 725/110 |
| 2004/0203353 A1 * | 10/2004 | Connor | H04M 1/72415 |
| | | | 455/420 |
| 2004/0226034 A1 * | 11/2004 | Kaczowka | H04N 5/76 |
| | | | 725/35 |
| 2004/0250282 A1 * | 12/2004 | Bankers | H04N 21/2143 |
| | | | 725/38 |
| 2004/0255336 A1 * | 12/2004 | Logan | H04N 21/4663 |
| | | | 725/38 |
| 2004/0268386 A1 * | 12/2004 | Logan | H04N 21/2543 |
| | | | 348/E7.071 |
| 2005/0033850 A1 * | 2/2005 | Kirkland | H04N 21/835 |
| | | | 709/228 |
| 2005/0034171 A1 * | 2/2005 | Benya | H04N 21/47214 |
| | | | 348/E7.071 |
| 2005/0251827 A1 * | 11/2005 | Ellis | H04N 21/4755 |
| | | | 348/E5.103 |
| 2005/0267813 A1 * | 12/2005 | Monday | H04N 21/47 |
| | | | 705/14.69 |
| 2006/0015580 A1 | 1/2006 | Gabriel et al. | |
| 2006/0020993 A1 * | 1/2006 | Hannum | H04N 21/6168 |
| | | | 725/111 |
| 2006/0080703 A1 * | 4/2006 | Compton | H04N 7/17309 |
| | | | 348/E7.07 |
| 2006/0130116 A1 * | 6/2006 | Shi | H04N 21/4333 |
| | | | 725/89 |
| 2006/0140584 A1 * | 6/2006 | Ellis | H04N 5/76 |
| | | | 348/E7.063 |
| 2006/0218604 A1 * | 9/2006 | Riedl | H04N 5/913 |
| | | | 348/E7.071 |
| 2006/0265384 A1 | 11/2006 | Lee et al. | |
| 2007/0044132 A1 | 2/2007 | Kubo et al. | |
| 2007/0094702 A1 * | 4/2007 | Khare | H04N 21/4335 |
| | | | 725/89 |
| 2007/0124250 A1 | 5/2007 | Yamashima et al. | |
| 2007/0130601 A1 | 6/2007 | Li et al. | |
| 2007/0154190 A1 | 7/2007 | Gilley et al. | |
| 2007/0162941 A1 | 7/2007 | Bennett et al. | |
| 2007/0180135 A1 | 8/2007 | Kenrick et al. | |
| 2007/0226169 A1 | 9/2007 | Solyanik et al. | |
| 2007/0239787 A1 | 10/2007 | Cunningham et al. | |
| 2007/0245384 A1 * | 10/2007 | Walter | H04W 88/02 |
| | | | 725/62 |
| 2007/0263514 A1 | 11/2007 | Iwata et al. | |
| 2007/0263980 A1 * | 11/2007 | Chen | G11B 27/005 |
| | | | 386/214 |
| 2007/0268164 A1 | 11/2007 | Lai et al. | |
| 2007/0276925 A1 * | 11/2007 | La Joie | H04N 21/835 |
| | | | 709/219 |
| 2007/0294170 A1 * | 12/2007 | Vantalon | H04N 21/4623 |
| | | | 705/50 |
| 2008/0005770 A1 * | 1/2008 | Acharya | H04N 21/6587 |
| | | | 348/E7.071 |
| 2008/0027953 A1 | 1/2008 | Morita et al. | |
| 2008/0031590 A1 * | 2/2008 | Kulas | H04N 9/8227 |
| | | | 386/E9.04 |
| 2008/0046929 A1 | 2/2008 | Cho et al. | |
| 2008/0059645 A1 * | 3/2008 | Gregotski | H04L 61/2564 |
| | | | 709/231 |

(56) References Cited

U.S. PATENT DOCUMENTS

| | | | |
|---|---|---|---|
| 2008/0091535 A1* | 4/2008 | Heiser, II | G06Q 30/0246 705/14.69 |
| 2008/0134239 A1* | 6/2008 | Knowles | H04N 21/4345 725/39 |
| 2008/0134278 A1* | 6/2008 | Al-Karmi | H04L 12/2834 455/556.1 |
| 2008/0140818 A1* | 6/2008 | Du Breuil | H04N 21/6137 709/223 |
| 2008/0209066 A1 | 8/2008 | Spio et al. | |
| 2008/0216119 A1 | 9/2008 | Pfeffer et al. | |
| 2008/0216135 A1 | 9/2008 | Pfeffer et al. | |
| 2008/0216136 A1 | 9/2008 | Pfeffer et al. | |
| 2009/0006643 A1 | 1/2009 | Lee | |
| 2009/0019492 A1 | 1/2009 | Grasset | |
| 2009/0028182 A1 | 1/2009 | Brooks et al. | |
| 2009/0029681 A1* | 1/2009 | Clemow | H04M 1/72427 455/412.2 |
| 2009/0119322 A1 | 5/2009 | Mills et al. | |
| 2009/0138507 A1* | 5/2009 | Burckart | G11B 27/105 |
| 2009/0154556 A1 | 6/2009 | Kim et al. | |
| 2010/0034257 A1 | 2/2010 | Sedeffow | |
| 2010/0036963 A1* | 2/2010 | Gahm | H04N 21/47202 709/231 |
| 2010/0115567 A1* | 5/2010 | Gupta | H04N 21/4131 725/106 |
| 2010/0115568 A1* | 5/2010 | Gupta | H04N 21/443 725/106 |
| 2010/0115575 A1 | 5/2010 | Yu et al. | |
| 2010/0174804 A1 | 7/2010 | Sonoyama | |
| 2011/0035600 A1 | 2/2011 | Busser et al. | |
| 2011/0106910 A1 | 5/2011 | Grasset | |
| 2011/0209185 A1 | 8/2011 | Cho et al. | |
| 2011/0255555 A1 | 10/2011 | Alexander | |
| 2011/0320559 A1 | 12/2011 | Foti | |
| 2012/0023251 A1 | 1/2012 | Pyle et al. | |
| 2012/0036048 A1 | 2/2012 | Robb et al. | |
| 2012/0054664 A1 | 3/2012 | Dougall et al. | |
| 2012/0084811 A1* | 4/2012 | Thompson | H04N 21/812 725/34 |
| 2012/0084812 A1* | 4/2012 | Thompson | H04N 21/44204 725/34 |
| 2012/0144408 A1* | 6/2012 | Kim | H04N 21/854 725/60 |
| 2012/0144424 A1 | 6/2012 | Ganesan et al. | |
| 2012/0185530 A1 | 7/2012 | Reza | |
| 2012/0210382 A1 | 8/2012 | Walker et al. | |
| 2012/0254536 A1 | 10/2012 | Wilke | |
| 2012/0266198 A1 | 10/2012 | Kanojia et al. | |
| 2013/0044260 A1 | 2/2013 | Vestergaard et al. | |
| 2013/0151493 A1 | 6/2013 | Roth et al. | |
| 2013/0262559 A1 | 10/2013 | Neerings et al. | |
| 2014/0025837 A1 | 1/2014 | Swenson et al. | |
| 2014/0040956 A1 | 2/2014 | Cho et al. | |
| 2014/0059134 A1 | 2/2014 | Chiu et al. | |
| 2014/0068789 A1 | 3/2014 | Watts et al. | |
| 2014/0082124 A1 | 3/2014 | van Coppenolle et al. | |
| 2014/0108585 A1 | 4/2014 | Barton et al. | |
| 2014/0115090 A1 | 4/2014 | Hasek | |
| 2014/0181864 A1 | 6/2014 | Marshall et al. | |
| 2014/0269401 A1 | 9/2014 | Gondi et al. | |
| 2014/0269920 A1 | 9/2014 | Rodriguez et al. | |
| 2014/0282787 A1 | 9/2014 | Wirick et al. | |
| 2014/0328569 A1 | 11/2014 | Strobl et al. | |
| 2014/0337901 A1 | 11/2014 | Phillips et al. | |
| 2014/0337903 A1 | 11/2014 | Zhu et al. | |
| 2014/0337909 A1 | 11/2014 | Phillips et al. | |
| 2014/0359140 A1 | 12/2014 | Shankarraman | |
| 2014/0359166 A1 | 12/2014 | Mamidwar et al. | |
| 2015/0007237 A1 | 1/2015 | Good | |
| 2015/0046526 A1 | 2/2015 | Bush et al. | |
| 2015/0113058 A1 | 4/2015 | Zhang et al. | |
| 2015/0135214 A1* | 5/2015 | Reisman | H04H 60/35 725/37 |
| 2015/0189018 A1 | 7/2015 | Cassidy et al. | |
| 2015/0227294 A1 | 8/2015 | Talvensaari et al. | |
| 2015/0242500 A1 | 8/2015 | Walker et al. | |
| 2015/0243078 A1 | 8/2015 | Watson et al. | |
| 2015/0244973 A1 | 8/2015 | Mullen et al. | |
| 2015/0249859 A1 | 9/2015 | Hartley et al. | |
| 2015/0269950 A1 | 9/2015 | Schug et al. | |
| 2015/0281710 A1 | 10/2015 | Sievert et al. | |
| 2015/0324379 A1 | 11/2015 | Danovitz et al. | |
| 2015/0339303 A1 | 11/2015 | Perlegos | |
| 2015/0341687 A1 | 11/2015 | Luthra et al. | |
| 2015/0350726 A1 | 12/2015 | Tan | |
| 2016/0014411 A1 | 1/2016 | Sychev | |
| 2016/0164938 A1 | 6/2016 | Yu | |
| 2016/0179826 A1 | 6/2016 | Batra | |
| 2016/0191961 A1 | 6/2016 | Fisher et al. | |
| 2016/0210165 A1 | 7/2016 | Ma | |
| 2016/0224310 A1 | 8/2016 | Wallner et al. | |
| 2016/0261912 A1 | 9/2016 | Gratton | |
| 2016/0309211 A1 | 10/2016 | Grasset | |
| 2016/0316234 A1 | 10/2016 | Casey et al. | |
| 2016/0323348 A1 | 11/2016 | Bradbury et al. | |
| 2016/0323351 A1 | 11/2016 | Luthra et al. | |
| 2016/0337477 A1 | 11/2016 | Bush et al. | |
| 2016/0344789 A1 | 11/2016 | Watts et al. | |
| 2016/0360243 A1 | 12/2016 | Arbuckle et al. | |
| 2016/0371286 A1 | 12/2016 | Danovitz et al. | |
| 2017/0006314 A1 | 1/2017 | Danovitz et al. | |
| 2017/0034112 A1 | 2/2017 | Perlegos | |
| 2017/0064311 A1 | 3/2017 | Ma | |
| 2017/0264968 A1 | 9/2017 | Mao et al. | |
| 2017/0339206 A1 | 11/2017 | Holden et al. | |
| 2017/0344335 A1 | 11/2017 | Lection et al. | |
| 2017/0353768 A1 | 12/2017 | Muvavarirwa | |
| 2018/0124445 A1 | 5/2018 | Beili et al. | |
| 2018/0167626 A1 | 6/2018 | Andersson et al. | |

FOREIGN PATENT DOCUMENTS

| | | |
|---|---|---|
| EP | 2 151 970 A1 | 2/2010 |
| EP | 2 977 915 A1 | 1/2016 |
| FR | 3036210 A1 | 11/2016 |

OTHER PUBLICATIONS

"AT&T Moving into Cable Territory With Homezone Service," printed from http://www.backchannelmedia.com/newsletter/articles/4881/ATampT-Moving-into-Cable-T . . . , 3 pages, Feb. 7, 2007.

"Adelphia Extends Partnership with Gotuit Media to Enhance On Demand Programming with Personalized Viewing," printed from http://www.atlasventure.com/newsandevents/news.cfm?id=308&p=1, 2 pages, Feb. 7, 2007.

"Front Porch Digital Signs Global Reseller Agreement with Volicon," printed from http://www.incentrasolutions.com/print.php./sid/37/aid/159/pid/211nid/447/siteype/Incentra, 3 pages, Feb. 7, 2007.

"Vividon and EMC Agree to Integrate 'Best in Class' On-demand Streaming and Centera Content Addressed Storage," PR Newswire (Sep. 16, 2002), NEM01616092002, InfoTrac OneFile, Thomson Gale, Social Law Library, 2 pages, Feb. 7, 2007.

Mostehaoui, A., "A modular and adaptive framework for large scale video indexing and content- based retrieval: the SIRSALE system," Softw. Pract. Exper., pp. 871-890, Mar. 28, 2006.

Mercer, C., "Keeping up with content: How to successfully manage VOD's bread-and-butter," Networking Advanced Networking Technology, www.cedmagazine.com, pp. 51-54, Dec. 2004.

Wang, B. et al., "Optimal Proxy Cache Allocation for Efficient Streaming Media Distribution," IEEE INFOCOM, pp. 1726-1735, 2002.

Czyrnek, M. et al., "Large-scale multimedia content delivery over optical networks for interactive TV services," Future Generation Computer Systems 22, pp. 1018-1024, 2006.

U.S. Appl. No. 12/055,795, filed Mar. 26, 2008, entitled "Digital Video Recording With Remote Storage".

\* cited by examiner

COPYRIGHT COMPLIANT TRICK PLAYBACK MODES IN A SERVICE PROVIDER NETWORK

CROSS REFERENCE TO RELATED APPLICATIONS

The present application is a continuation of U.S. patent application Ser. No. 17/186,475, filed Feb. 26, 2021, now U.S. Pat. No. 11,284,165.

BACKGROUND

For decades, television viewers have been able to record programming for later viewing using videotape and, more recently, digital video recording (DVR) technology. This practice of "time-shifting" has long been recognized as permissible even for media content subject to copyright. Moreover, challenges facing service providers, also referred to as Multi-System Operators (MSOs), are not purely technical. Owners of media content have acknowledged court rulings that established the principle that copies of media content made by a subscriber for his own viewing is "fair use" of such media content. However, the owners of media content have attempted to limit the applicability of such rulings to require the MSOs to obtain additional licenses for the media content which significantly increases the costs of proving the media content.

BRIEF DESCRIPTION OF THE DRAWINGS

In the drawings, like reference characters generally refer to the same parts or steps throughout the different views. Also, the drawings are not necessarily to scale, emphasis instead generally being placed upon illustrating the principles of the invention.

DETAILED DESCRIPTION

Overview

Systems, methods, and apparatuses disclosed herein can enable subscriber of a service with capabilities of performing one or more trick playback modes, such as pause, play, stop, fast-forward, and/or rewind to provide some examples, on media content provided by a service provider network that is being presently viewed by one or more subscribers while abiding by current copyright laws. As described in further detail below, the systems, the methods, and the apparatuses can broadcast the media content to a subscriber device that is associated with the subscriber and can simultaneously store an exclusive copy of the media content being displayed by the subscriber device. And, the systems, methods, and apparatuses can time-shift the exclusive copy of the media content in accordance with the one or more trick playback modes and can unicast the time-shifted copy of the media content to the subscriber device to perform the one or more trick playback modes.

Exemplary Service Provider Network

Figure 1:
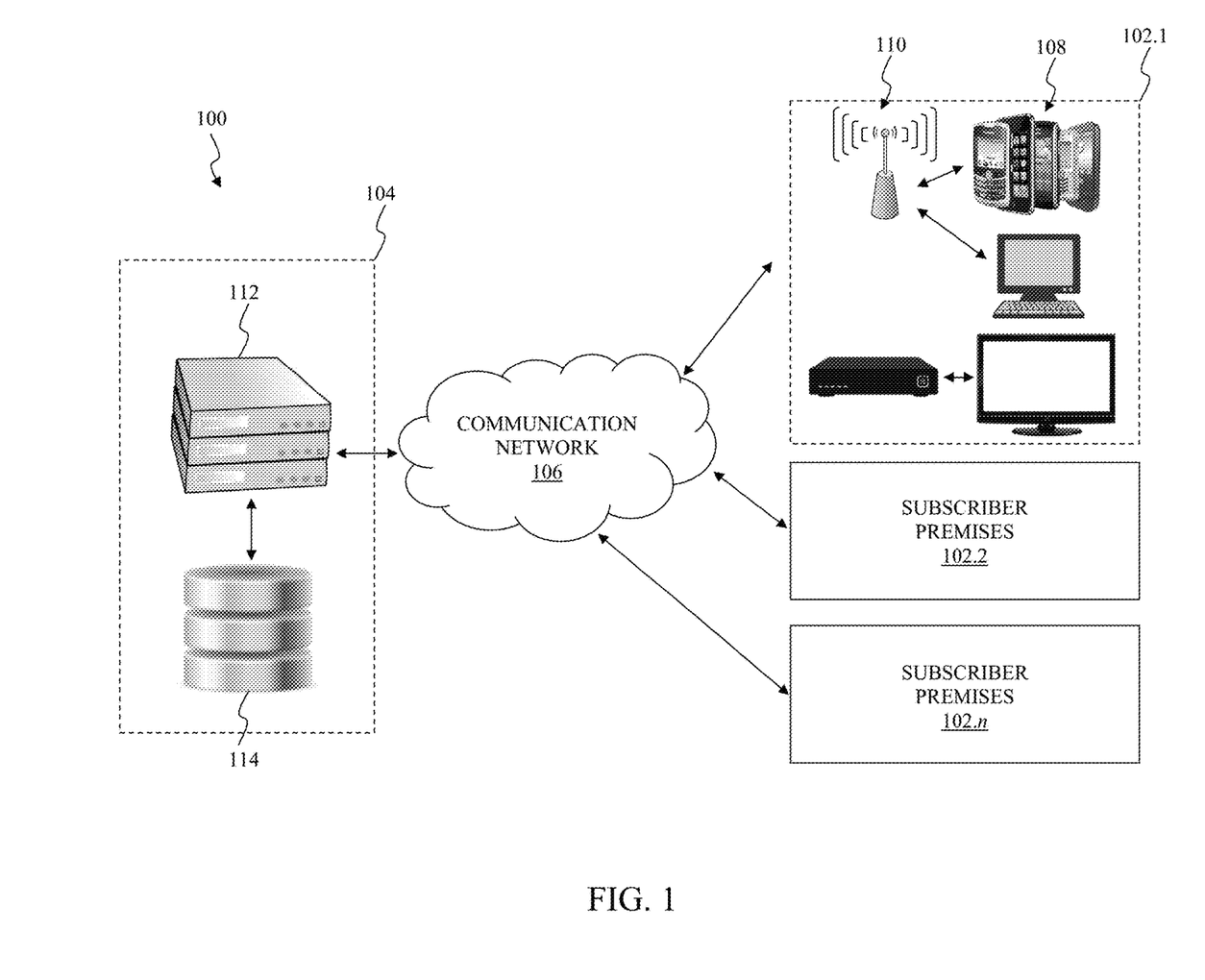
FIG. 1 graphically illustrates an exemplary service provider network according to some exemplary embodiments of the present disclosure.

FIG. 1 graphically illustrates an exemplary service provider network according to some exemplary embodiments of the present disclosure. In the exemplary embodiment illustrated in FIG. 1, a service provider network 100 provides electronic communication between subscriber premises 102.1 through 102.$n$ and a service provider system 104 via a communication network 106. In some embodiments, the service provider system 104 can deliver media content, such as movies, television programs, and/or advertising, to the subscriber premises 102.1 through 102.$n$ in a downstream direction. As used herein, the term "downstream direction" refers to the transfer of information from the service provider system 104 to the subscriber premises 102.1 through 102.$n$. As to described in further detail below, the service provider system 104 can enable one or more subscribers associated with the subscriber premises 102.1 through 102.$n$ with capabilities of performing one or more trick playback modes, such as pause, play, stop, fast-forward, and/or rewind to provide some examples, on the media content streamed by the service provider system 104 while abiding by current copyright laws. The current copyright laws require that each copy of the media content stored in the service provider system 104 be exclusively accessible by only one of the one or more subscribers and/or stored in an exclusive region of a storage space that is exclusively accessible by only one of the one or more subscribers. In some embodiments, the service provider system 104 can broadcast the media content to the subscriber premises 102.1 through 102.$n$ over one or more primary media transport streams. As to be described in further detail below, the service provider system 104 can simultaneously store exclusive copies of the media content that is being displayed by the subscriber premises 102.1 through 102.$n$ with each exclusive copy being exclusive to only one of the one or more subscribers and/or stored in exclusive regions of a storage space that are exclusively accessible by only one of the one or more subscribers to abide by the current copyright laws. And, upon receiving one or more commands from a subscriber associated with a subscriber premise from among the subscriber premises 102.1 through 102.$n$ to execute the one or more trick playback modes, the service provider system 104 can time-shift, for example, fast-forward, rewind, and/or pause to provide some examples, the exclusive copy of the media content that is stored in the exclusive region of the storage space that is exclusively accessible by the subscriber in accordance with the one or more trick playback modes. Thereafter, the service provider system 104 can unicast the time-shifted copy of the media content from the exclusive region of the storage space that is exclusively accessible by the subscriber to the subscriber premise in the downstream direction over one or more secondary media transport streams to effectively execute the one or more trick playback modes while maintaining compliance with the current copyright laws.

In the exemplary embodiment illustrated in FIG. 1, the subscriber premises 102.1 through 102.$n$ represent building and/or non-building structures that receive a service from the service provider network 100. Generally, the one or more building structures refer to any suitable structure or structures that are designed for human occupancy and can include one or more residential, industrial, and/or commercial building structures to provide some examples. Generally, the one or more non-building structures refer to any suitable structure or structures that are not designed for human occupancy and can include one or more residential, industrial, and/or commercial non-building structures to provide some examples. In an exemplary embodiment, the subscriber premises 102.1 through 102.*n* represent building and/or non-building structures that have entered into service agreements with a service provider operating the service provider system 104 to provide a service for electronic communication, such as audio, video, and/or data communication to provide some examples, between the subscriber premises 102.1 through 102.*n* and the service provider system 104. The service agreements often define quality of service (QoS), for example, speeds of the downstream direction or speeds of the upstream direction, between corresponding subscriber premises from among the subscriber premises 102.1 through 102.*n* and the service provider system 104.

In the exemplary embodiment illustrated in FIG. 1, each of the subscriber premises 102.1 through 102.*n* can be associated with a corresponding subscriber from among multiple subscribers of the service. In an exemplary embodiment, the corresponding subscriber can represent one or more persons of a household. As illustrated in FIG. 1, each of the subscriber premises 102.1 through 102.*n* can include one or more electronic devices 108 and one or more access points 110 communicatively coupled between the one or more electronic devices 108 and the service provider system 104 via the communication network 106. Generally, the one or more electronic devices 108 represent any suitable mechanical, electrical, and/or electronic devices that are capable of receiving the electronic communication from the service provider system 104 via the one or more access points 110 in the downstream direction and/or transmitting the electronic communication to the service provider system 104 via the one or more access points 110 in the upstream direction. In some embodiments, the one or more electronic devices 108 can include mobile telephony devices, such as mobile phones, mobile computing devices, mobile internet devices, such as tablet computers and/or laptop computers, video game consoles, portable media players, peripheral devices, such as wireless speakers, mice, keyboards, monitors, printers, and/or scanners, internet capable appliances, smart televisions, and/or other suitable communication devices that are capable of wireless communication that will be recognized by those skilled in the relevant art(s) without departing from the spirit and scope of the present disclosure. Generally, the one or more access points 110 represent any suitable mechanical, electrical, and/or electronic devices that are capable of receiving the electronic communication from the service provider system 104 via the communication network 106 in the downstream direction and/or transmitting the electronic communication to the service provider system 104 via the communication network 106 in the upstream direction. In some embodiments, the one or more access points 110 can include wireless routers, cable modems, set-top boxes and/or digital subscriber line (DSL) modems, and/or any combination thereof.

The service provider system 104 represents one or more computer systems, an exemplary embodiment of which is to be described in further detail below, which facilitate execution of the service. In the exemplary embodiment illustrated in FIG. 1, the service provider system 104 can stream the media content, such as the movies, the television programs, and/or the advertising, to the subscriber premises 102.1 through 102.*n* in the downstream direction. As illustrated in FIG. 1, the service provider system 104 can broadcast the media content to the one or more access points 110 within the subscriber premises 102.1 through 102.*n*. The one or more access points 110 can thereafter route the media content to the one or more electronic devices 108 within the subscriber premises 102.1 through 102.*n*. In some situations, one or more subscribers associated with the subscriber premises 102.1 through 102.*n* can request to perform one or more trick playback modes, such as pause, play, stop, fast-forward, and/or rewind to provide some examples, on the media content being displayed by the subscriber premises 102.1 through 102.*n*. As to be described in further detail below, the service provider system 104 can enable the one or more subscribers with capabilities of performing these trick playback modes on the media content being displayed by the subscriber premises 102.1 through 102.*n* while abiding by current copyright laws. In the exemplary embodiment illustrated in FIG. 1, the service provider system 104 can include a service provider sever 112 and a service provider storage 114.

Often times, the media content streamed by the service provider system 104 is subject to the current copyright laws. The current copyright laws allow for the private, noncommercial use of copyright-protected material without asking permission from the owner of the copyright-protected material. At the outset, the current copyright laws often require that the one or more subscribers initiate the fair use of the copyright-protected material. In some embodiments, the service provider server 112 can receive one or more trick playback mode authorizations from the one or more subscribers which can allow the service provider server 112 to copy the media content on behalf of the one or more subscribers while maintaining compliance with the current copyright laws. In some embodiments, the service provider server 112 can enable the one or more trick playback modes for the one or more subscribers from among the one or more subscribers in response to receiving the one or more trick playback mode authorizations from these subscribers to maintain compliance with the current copyright laws. In some embodiments, the service provider server 112 can disable the one or more trick playback modes for the one or more subscribers until the one or more trick playback mode authorizations are received from these subscribers to maintain compliance with the current copyright laws.

In some embodiments, the service provider server 112 can deliver one or more interactive authorization messages to the subscriber premises 102.1 through 102.*n* for display on the one or more electronic devices 108 within these subscriber premises. In these embodiments, the one or more interactive authorization messages can outline the nature of the exclusive copying to be performed by the service provider server 112, which is to be described in further detail below. In these embodiments, the one or more subscribers that are associated with these electronic devices can interact with these interactive authorization messages, for example, by clicking on one or more radio buttons and/or check boxes, within these authorization messages, to request the service provider server 112 to copy the streaming media on their behalf, as to be described in further detail below, to maintain compliance with the current copyright laws. In some embodiments, the service provider server 112 can deliver the one or more interactive authorization messages in response to one or more initializing events occurring within the subscriber premises 102.1 through 102.*n*, such as powering-on, initializing, and/or associating one or more of the one or more electronic devices 108 and/or one or more of the one or more access points 110 to provide some examples. In some embodiments, the one or more subscribers that are associated with the subscriber premises 102.1 through 102.*n* can request the service provider server 112 to deliver one or more interactive authorization messages.

In the exemplary embodiment illustrated in FIG. 1, the service provider server 112 can stream the media content to the subscriber premises 102.1 through 102.*n* in the downstream direction. In some embodiments, the service provider server 112 can simultaneously store the exclusive copies of the media content being displayed by the subscriber premises 102.1 through 102.*n* in the service provider storage 114 as the media content is being streamed to the subscriber premises 102.1 through 102.*n*. In the exemplary embodiment illustrated in FIG. 1, the subscriber premises 102.1 through 102.*n* can display one of more of the media content that is streamed by the service provider server 112. In some embodiments, the service provider server 112 can receive one or more media content indicators, such as one or more tuned channels to provide an example, that correspond to the media content being displayed by the subscriber premises 102.1 through 102.*n*. In these embodiments, the service provider server 112 can correlate the one or more media content indicators with the media content being streamed to the subscriber premises 102.1 through 102.*n* to determine the media content being displayed by the subscriber premises 102.1 through 102.*n*. As described above, the current copyright laws require that each of these copies of the media content stored in the service provider system 104 be exclusively accessible by only one of one or more subscribers that are associated with the subscriber premises 102.1 through 102.*n* and/or stored in an exclusive region of the service provider storage 114 that is exclusively accessible by only one of the one or more subscribers. Exemplary embodiments of the service provider storage 114 are further described in U.S. patent application Ser. No. 12/055,795, filed on Mar. 26, 2008, and/or U.S. patent application Ser. No. 15/395,877, filed Dec. 30, 2016, each of which is incorporated herein by reference in its entirety. In the exemplary embodiment illustrated in FIG. 1, the service provider storage 114 can include multiple exclusive storage regions with each exclusive storage region of the service provider storage 114 being exclusively accessible by only one subscriber from among the one or more subscribers. In some embodiments, the multiple exclusive storage regions can be implemented as multiple exclusive storage queues with each of the multiple exclusive storage queues being exclusively accessible by only one subscriber from among the one or more subscribers. In these embodiments, the multiple exclusive storage regions can store a fixed, limited duration, for example, up to and including ten (10) minutes, twenty (20) minutes, or thirty (30) minutes, of the media content being displayed by the subscriber premises 102.1 through 102.*n*. In some embodiments, the multiple exclusive storage regions can be implemented as one or more first in, first out (FIFO) queues, one or more circular buffers, and/or any other suitable architecture that will be apparent to those skilled in the relevant art(s). In some embodiments, as one of the multiple exclusive storage regions approach this fixed, limited duration, the service provider storage 114 can erase some of the media content from this multiple exclusive storage region that was stored earlier in time to copy the media stream.

During operation, the service provider storage 114 stores the media content that is being displayed by the subscriber premises 102.1 through 102.*n* into multiple exclusive storage regions that are associated with the one or more subscribers with each multiple exclusive storage region being exclusively accessible by only one of the one or more subscribers. In some embodiments, these exclusive copies of the media content stored into the multiple exclusive storage regions can be synchronized with the media content that is being streamed to the subscriber premises 102.1 through 102.*n*. Upon receiving, a command to perform a trick playback mode from a subscriber premise from among the subscriber premises 102.1 through 102.*n*, the service provider server 112 sets a logical playback marker that is associated with its exclusive copy of the media content and is associated in time with the command to perform the trick playback mode and continues to store the media content that is being streamed to the subscriber premise into its exclusive storage region. In some embodiments, the service provider server 112 can advance the logical playback marker in time when the trick playback mode corresponds to the fast-forward trick playback mode and/or can retreat the logical playback marker in time when the trick playback mode corresponds to the rewind trick playback mode. Thereafter, the service provider server 112 can resume streaming of the media content to the subscriber premise by retrieving and streaming the exclusive copy of the media content stored within the exclusive storage region from among the multiple exclusive storage regions that is associated with the subscriber. In some embodiments, the service provider server 112 can resume streaming of the media content starting from the logical playback marker. In some embodiments, the service provider server 112 can resume streaming of the exclusive copy of the media content stored within the exclusive storage region in response to receiving a command to resume the playback of the media content from the subscriber.

In the exemplary embodiment illustrated in FIG. 1, the service provider server 112 can stream the media content to the one or more subscriber premises over one or more transport streams. In some embodiments, the one or more transport streams can include the one or more primary transport streams to broadcast the media content to the subscriber premises 102.1 through 102.*n* in the downstream direction. In some embodiments, the one or more transport streams can include the one or more secondary transport streams to unicast the exclusive copy of the media content to a subscriber premises from among the subscriber premises that is associated with the subscriber in the downstream direction. In some embodiments, the service provider server 112 can send one or more commands to the one or more access points 110 that is associated with the subscriber premises to seamlessly tune from the one or more primary transport streams to the one or more secondary transport streams to receive the exclusive copy of the media content to perform the trick playback mode. In some embodiments, the one or more primary transport streams can be from among multiple primary transport streams for delivering multiple media content to the subscriber premises 102.1 through 102.*n* in the downstream direction. In these embodiments, the subscriber can select the media content from among the multiple media content to be displayed by the subscriber premises, for example, by tuning to the one or more primary transport streams from among the multiple primary transport streams having the media content. In these embodiments, the service provider server 112 can cause the service provider storage 114 to erase the exclusive copy of the media content that is associated with the subscriber in response to the subscriber selecting a different media content from among the multiple media content to be displayed by the subscriber premises for example, by tuning to one or more different primary transport streams from among the multiple primary transport streams having the different media content. In these embodiments, the service provider server 112 can cause the service provider storage 114 to flush, or erase, an exclusive storage region from among the multiple exclusive storage regions that is associated with the subscriber to erase the exclusive copy of the media content that is associated with the subscriber.

As illustrated in FIG. 1, the communication network 106 communicatively couples the subscriber premises 102.1 through 102.*n* and the service provider system 104. The communication network 106 can implemented as a wireless communication network, a wireline communication network, and/or any combination thereof that will be apparent to those skilled in the relevant art(s) without departing from the spirit and scope of the present disclosure. For example, the communication network 106 can include one or more radio networks, such as terrestrial radio frequency networks or satellite radio frequency networks, one or more coaxial cable networks, and/or one or more fiber optic cable networks.

Figure 2:
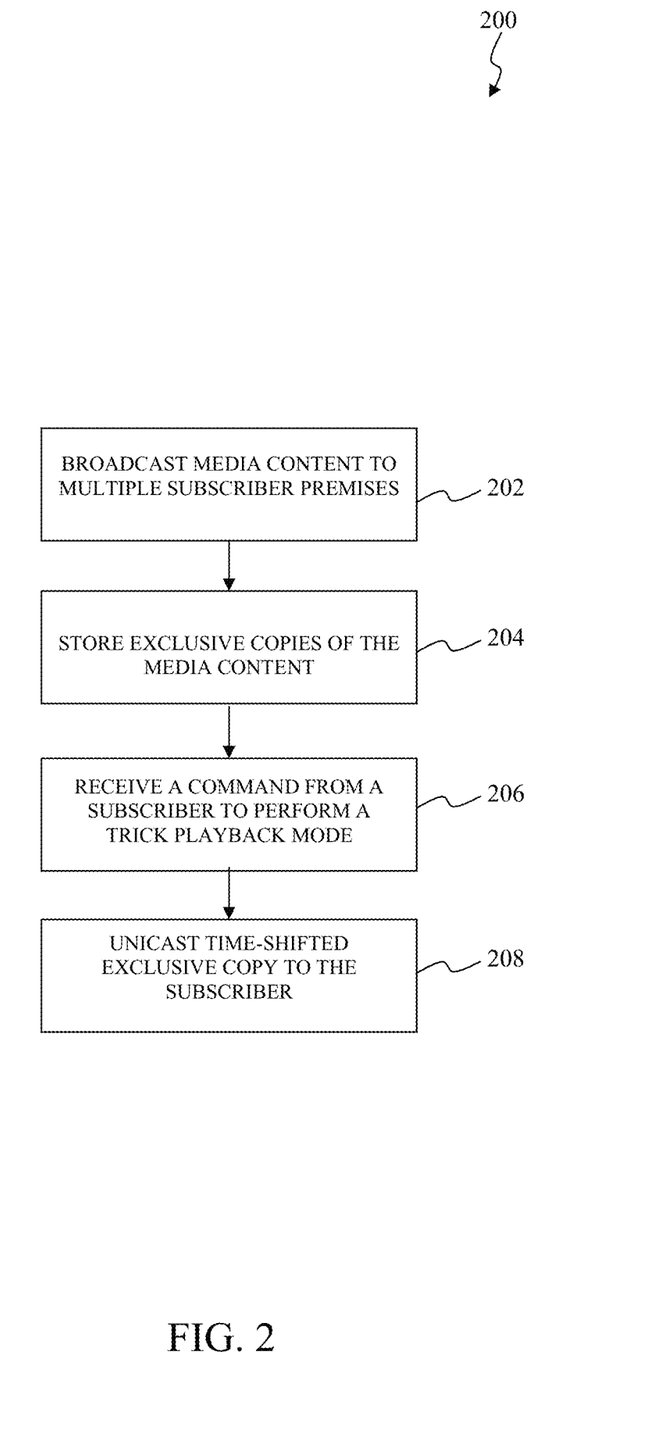
FIG. 2 illustrates a flowchart for performing an exemplary track playback mode with the exemplary service provider network according to some exemplary embodiments of the present disclosure.

Exemplary Trick Playback Modes that can be Implemented within the Exemplary Service Provider Network FIG. 2 illustrates a flowchart for performing an exemplary track playback mode with the exemplary service provider network according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 200 for performing one or more trick playback modes, such as pause, play, stop, fast-forward, and/or rewind to provide some examples, on the media content streamed by a service provider network, such as the service provider network 100 to provide an example, while abiding by current copyright laws. The operational control flow 200 can be executed by one or more computer systems, such as the service provider system 104 as described above in FIG. 1.

At operation 202, the operational control flow 200 broadcasts media content, such as movies, television programs, and/or advertising, to multiple subscriber premises, such as the subscriber premises 102.1 through 102.*n* as described above in FIG. 1 to provide an example. In some embodiments, the operational control flow 200 can broadcast the media content to the multiple subscriber premises in the downstream direction over one or more primary transport streams.

At operation 204, the operational control flow 200 stores multiple exclusive copies of the media content 202 being displayed by the multiple subscriber premises. As described above, the current copyright laws require that each copy of the media content stored at operation 204 be exclusively accessible by only one of one or more subscribers associated with the multiple subscriber premises and/or stored in an exclusive region of a storage space, such as the service provider storage 114 as described above to provide an example, that is exclusively accessible by only one of the one or more subscribers. At operation 204, the operational control flow 200 stores the media content being displayed by the multiple subscriber premises from operation 202 into multiple exclusive storage regions, such as multiple exclusive storage regions of the service provider storage 114 as described above in FIG. 1 to provide an example, that are associated with the one or more subscribers with each multiple exclusive storage region being exclusively accessible by only one of the one or more subscribers.

At operation 206, the operational control flow 200 receives a command from a subscriber premises from among the multiple subscriber premises that is associated with a subscriber from among the one or more subscribers to perform a trick playback mode. In some embodiments, the operational control flow 200 sets a logical playback marker that is associated with an exclusive copy from among the multiple exclusive copies of the media content from operation 204 that is associated with the subscriber. In some embodiments, the operational control flow 200 can advance the logical playback marker in time when the trick playback mode corresponds to the fast-forward trick playback mode and/or can retreat the logical playback marker in time when the trick playback mode corresponds to the rewind trick playback mode.

At operation 208, the operational control flow 200 unicasts a time-shifted exclusive copy of the media content to the subscriber to perform the trick playback mode from operation 206. At operation 208, the service provider server 112 can resume streaming of the media content to the subscriber premise by retrieving the time-shifted exclusive copy of the media content from operation 206 from the exclusive storage region from among the multiple exclusive storage regions that is associated with the subscriber. Thereafter, the operational control flow 200 can unicast the time-shifted exclusive copy of the media content to the subscriber to perform the trick playback mode in the downstream direction over one or more secondary transport streams. In some embodiments, the operational control flow 200 can unicast the media content starting from the logical playback marker from operation 206. In some embodiments, the operational control flow 200 can unicast the time-shifted exclusive copy of the media content stored within the exclusive storage region in response to receiving a command to resume the playback of the media content from the subscriber from operation 206.

Figure 3:
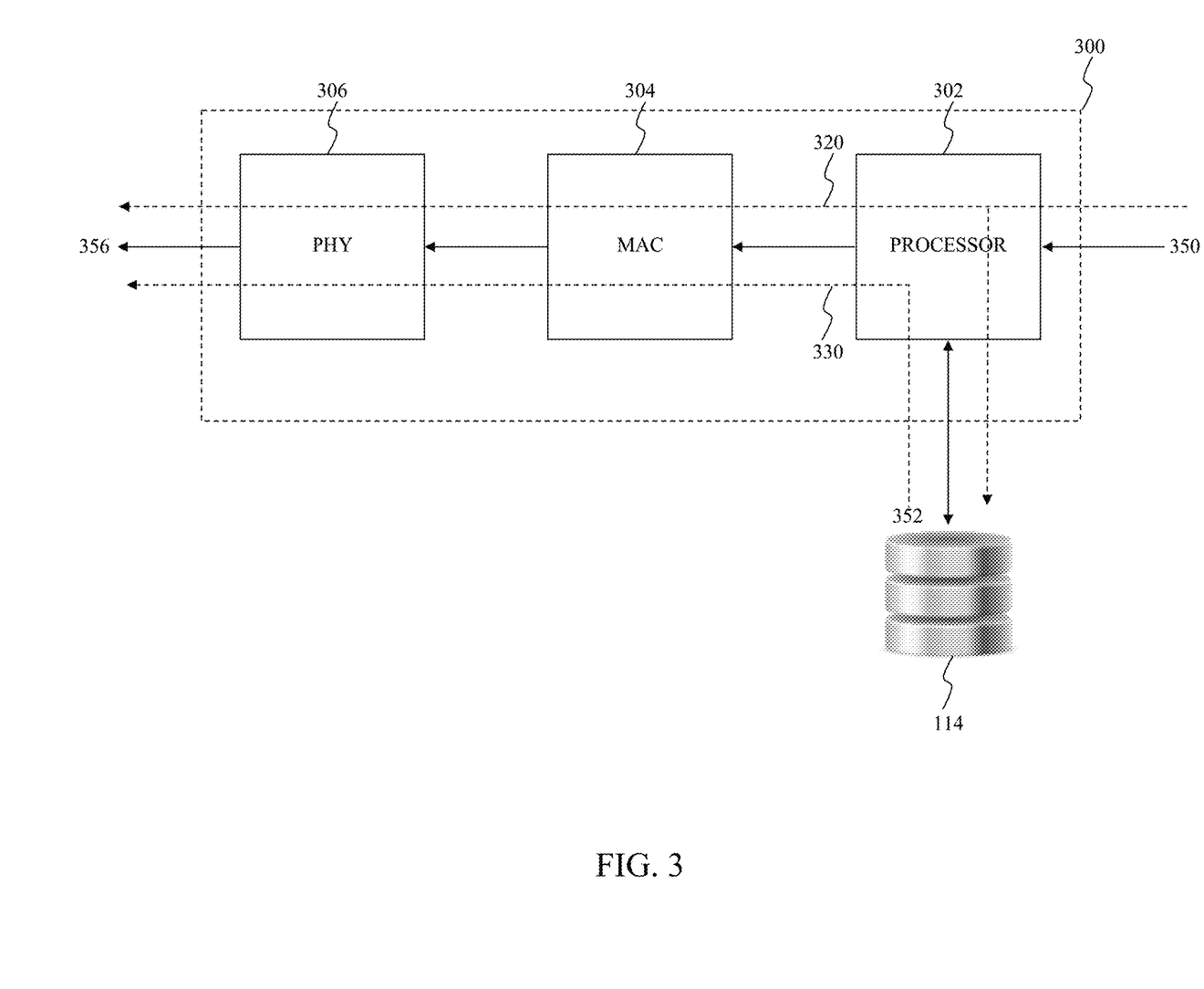
FIG. 3 illustrates a block diagram of an exemplary service provider server that can be implemented within the exemplary service provider network according to some exemplary embodiments of the present disclosure.

Exemplary Service Provider Server that can be Implemented within the Exemplary Service Provider Network FIG. 3 illustrates a block diagram of an exemplary service provider server that can be implemented within the exemplary service provider network according to some exemplary embodiments of the present disclosure. In the exemplary embodiment illustrated in FIG. 3, a service provider server 300 can deliver media content, such as movies, television programs, and/or advertising, to subscriber premises, such as the subscriber premises 102.1 through 102.*n* as described above in FIG. 1 to provide an example. As to described in further detail below, the service provider server 300 can enable one or more subscribers associated with the subscriber premises with capabilities of performing one or more trick playback modes, such as pause, play, stop, fast-forward, and/or rewind to provide some examples, on the media content streamed by the service provider system 300 while abiding by current copyright laws as described above. In some embodiments, the service provider server 300 can broadcast the media content to the subscriber premises over one or more primary media transport streams. As to be described in further detail below, the service provider server 300 can simultaneously store exclusive copies of the media content being displayed by the subscriber premises in exclusive regions of a storage space, such as the service provider storage 114 as described above in FIG. 1 to provide an example, that are exclusively accessible by only one of the one or more subscribers to abide by the current copyright laws. And, upon receiving one or more commands from a subscriber associated with a subscriber premise from among the subscriber premises to execute the one or more trick playback modes, the service provider server 300 can timeshift, for example, fast-forward, rewind, and/or pause to provide some examples, the exclusive copy of the media content that is stored in the exclusive region of the storage space that is exclusively accessible by the subscriber. Thereafter, the service provider server 300 can unicast the time-shifted copy of the media content from the exclusive region of the storage space that is exclusively accessible by the subscriber to the subscriber premise in the downstream direction over one or more secondary media transport streams to effectively execute the one or more trick playback modes while maintaining compliance with the current copyright laws. In the exemplary embodiment illustrated in FIG. 3, the service provider server 300 can include processor circuitry 306, media access controller (MAC) circuitry 304, and physical layer (PHY) circuitry 302. The service provider server 300 can represent an exemplary embodiment of the service provider sever 112 as described above in FIG. 1.

The processor circuitry 302 controls overall operation and/or configuration of the service provider server 300. In the exemplary embodiment illustrated in FIG. 3, the processor circuitry 302 receives media content 350, such as movies, television programs, and/or advertising, to be broadcast to the subscriber premises. As illustrated in a broadcast mode of operation 320, the processor circuitry 302 can provide the media content 350, which is to be broadcast to the one or more subscriber premises, to the MAC circuitry 304. In the broadcast mode of operation 320, the processor circuitry 302 can determine the media content being displayed by the one or more subscriber premises and deliver the media content being displayed by the one or more subscriber premises to the service provider storage 114. The service provider storage 114 can store the media content 350 being displayed by the one or more subscriber premises into multiple exclusive storage regions that are associated with the one or more subscribers with each multiple exclusive storage region being exclusively accessible by only one of the one or more subscribers in a substantially similar manner as described above in FIG. 1 and FIG. 2 to maintain compliance with the current copyright laws. As illustrated in a unicast mode of operation 330, the processor circuitry 302 can retrieve an exclusive copy of the media content 352 from the service provider storage 114. In some embodiments, the processor circuitry 302 can receive a command to perform a trick playback mode from a subscriber premise from among the subscriber premises. In these embodiments, the processor circuitry 302 can set a logical playback marker that is associated with the exclusive copy of the media content 352 and is associated in time with the command to perform the trick playback mode. In some embodiments, the processor circuitry 302 can advance the logical playback marker in time when the trick playback mode corresponds to the fast-forward trick playback mode and/or can retreat the logical playback marker in time when the trick playback mode corresponds to the rewind trick playback mode. In some embodiments, the processor circuitry 302 can retrieve the exclusive copy of the media content 352 starting from the logical playback marker. In some embodiments, the processor circuitry 302 can retrieve the exclusive copy of the media content 352 in response to receiving a command to resume the playback of the media content from the subscriber.

The MAC circuitry 304 represents an interface between the PHY circuitry 306 and the processor circuitry 302. The MAC circuitry 304 manages and maintains communication of the service provider server 300 by coordinating access to the transmission medium and formatting communication in accordance with one or more communication standards or protocols, such as one or more versions of the Moving Picture Experts Group (MPEG) communication standard or protocol to provide an example, that are supported by the service provider server 300. In the exemplary embodiment illustrated in FIG. 3, the MAC circuitry 304 encapsulates or frames the media content 350 in accordance with the one or more communication standards or protocols in the broadcast mode of operation 320 and/or the exclusive copy of the media content 352 in accordance with the one or more communication standards or protocols in the unicast mode of operation 330.

The PHY circuitry 306 represents an interface between a communication network, such as the communication network 106 as illustrated in FIG. 1 to provide an example, and the MAC circuitry 304. Generally, the PHY circuitry 306 demodulates, decodes, and/or converts the media content 350 and/or the exclusive copy of the media content 352 received from the MAC circuitry 304 for transmission over one or more transport streams 356. In the exemplary embodiment illustrated in FIG. 3, the PHY circuitry 306 can broadcast the media content 350 over one or more primary transport streams from among the one or more transport streams 356 to the one or more subscriber premises in the broadcast mode of operation 320. In the exemplary embodiment illustrated in FIG. 3, the PHY circuitry 306 can unicast the exclusive copy of the media content 352 over one or more secondary transport streams from among the one or more transport streams 356 to the subscriber premises that is associated with the subscriber that provided the command to perform the trick playback mode in the unicast mode of operation 330.

Figure 4:
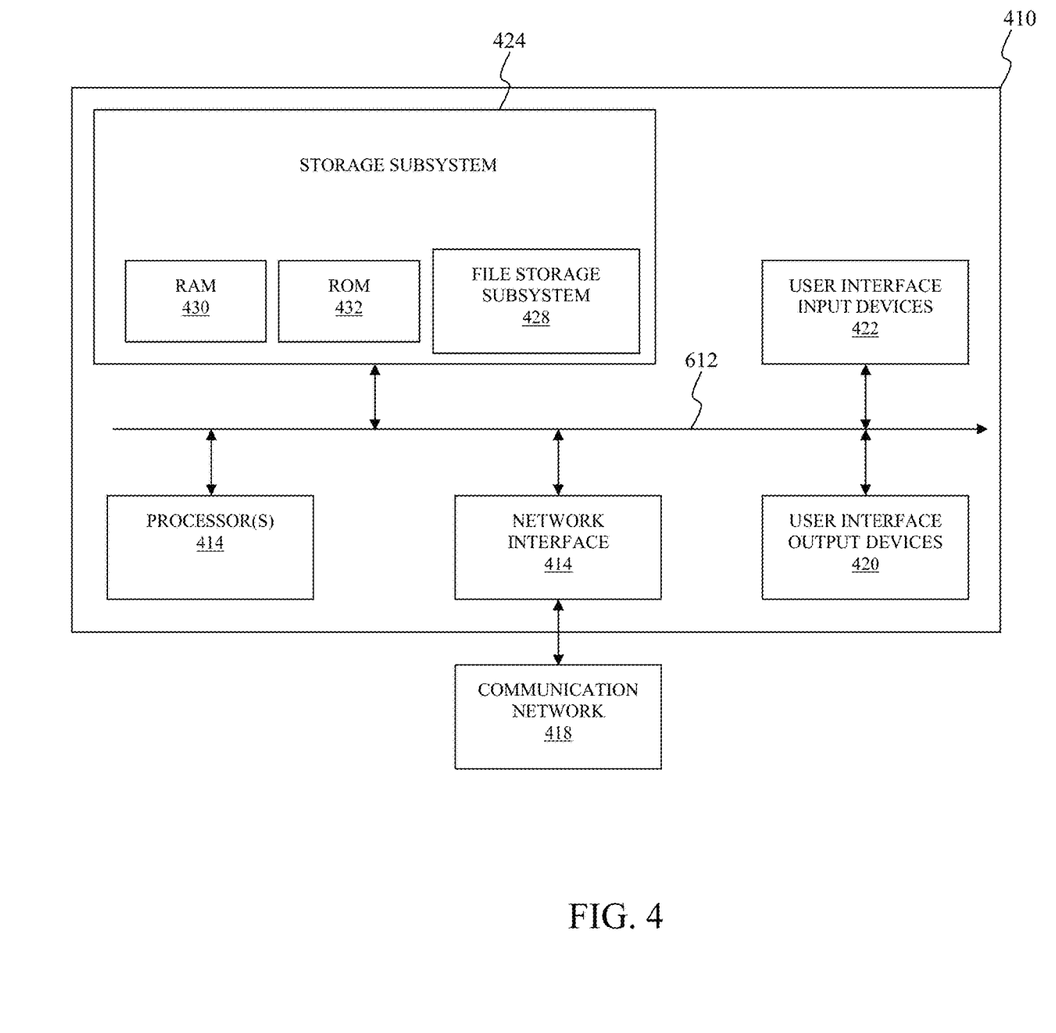
FIG. 4 graphically illustrates a simplified block diagram of a computer system suitable for use with embodiments described herein, as well as circuit design and circuit embodiments of the technology, according to some exemplary embodiments of the present disclosure.

Exemplary Computer System that can be Utilized to Implement Devices within the Exemplary Wireless Network FIG. 4 graphically illustrates a simplified block diagram of a computer system suitable for use with embodiments described herein, as well as circuit design and circuit embodiments of the technology, according to some exemplary embodiments of the present disclosure. The various electronic devices, for example, the service provider system 104, as described above can be implemented in hardware, firmware, software, or any combination thereof. The discussion of FIG. 4 to follow describes an exemplary computer system 410 that can be used for these electronic devices.

In the exemplary embodiment illustrated in FIG. 4, the computer system 410 typically includes at least one processor 414 which communicates with a number of peripheral devices via bus subsystem 412. Typically, the at least processor 414 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).)

The computer system typically includes an operating system, such as Microsoft's Windows, Sun Microsystems's Solaris, Apple Computer's MacOs, Linux or UNIX. The computer system also typically can include a Basic Input/Output System (BIOS) and processor firmware. The operating system, BIOS and firmware are used by the processor to control subsystems and interfaces coupled to the processor. Typical processors compatible with these operating systems include the Pentium and Itanium from Intel, the Opteron and Athlon from Advanced Micro Devices, and the ARM processor from ARM Holdings.

As illustrated in FIG. 4, these peripheral devices may include a storage subsystem 424, comprising a memory subsystem 426 and a file storage subsystem 428, user interface input devices 422, user interface output devices 420, and a network interface subsystem 416. The input and output devices allow user interaction with computer system 410. In the exemplary embodiment illustrated in FIG. 4, the network interface subsystem 416 provides an interface to outside networks, including an interface to a communication network 418, and is coupled via a communication network 418 to corresponding interface devices in other computer systems or machines. The communication network 418 may comprise many interconnected computer systems, machines and communication links. These communication links may be wired links, optical links, wireless links, or any other devices for communication of information. The communication network 418 can be any suitable computer network, for example a wide area network such as the Internet, and/or a local area network such as Ethernet. The communication network 418 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

The user interface input devices 422 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into the computer system 410 or onto the communication network 418. The user interface input devices 422 typically allow a user to select objects, icons, text and the like that appear on some types of user interface output devices, for example, a display subsystem.

The user interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from the computer system 410 to the user or to another machine or computer system.

The memory subsystem 426 typically includes a number of memories including a main random-access memory ("RAM") 430 (or other volatile storage device) for storage of instructions and data during program execution and a read only memory ("ROM") 432 in which fixed instructions are stored. The file storage subsystem 428 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 428.

The bus subsystem 412 provides a device for letting the various components and subsystems of the computer system 410 communicate with each other as intended. Although the bus subsystem 412 is shown schematically as a single bus, alternative embodiments of the bus subsystem may use multiple busses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A service provider server, comprising:
   a memory configured to store a plurality of instructions;
   a processor, configured to execute the plurality of instructions, the plurality of instructions, when executed by the processor, configuring the processor to:
      provide a plurality of media content over a plurality of primary transport streams to a plurality of subscribers,
      store an exclusive copy of a media content from among the plurality of media content into an exclusive region from among a plurality of exclusive regions for storing media content in response to a subscriber from among the plurality of subscribers selecting a primary transport stream from among the plurality of primary transport streams having the media content, the exclusive region being associated with only the subscriber and being exclusively accessible by only the subscriber,
      flush the exclusive region to erase the exclusive copy from the exclusive region in response to the subscriber selecting a different primary transport stream from among the primary transport streams having different media content from among the plurality of media content, and
      store an exclusive copy of the different media content into the exclusive region in response to the subscriber selecting the different primary transport stream.

2. The service provider server of claim 1, wherein the plurality of instructions, when executed by the processor, further configures the processor to receive an authorization from the subscriber to copy the media content on behalf of the subscriber.

3. The service provider server of claim 1, wherein the plurality of instructions, when executed by the processor, further configures the processor to set a logical playback marker that is associated with the exclusive copy of the different media content in response to receiving a first command from the subscriber to perform a trick playback mode on the different media content.

4. The service provider server of claim 3, wherein the plurality of instructions, when executed by the processor, further configures the processor to advance or to retreat the logical playback marker in time in response to the trick playback mode.

5. The service provider server of claim 3, wherein the plurality of instructions, when executed by the processor, further configures the processor to retrieve the exclusive copy of the different media content starting from the logical playback marker in response to receiving a second command from the subscriber to resume streaming of the different media content.

6. The service provider server of claim 1, wherein the plurality of instructions, when executed by the processor, further configures the processor to retrieve the exclusive copy of the different media content in response to a command from the subscriber to perform a trick playback mode on the different media content.

7. The service provider server of claim 6, wherein the plurality of instructions, when executed by the processor, further configures the processor to unicast the exclusive copy of the different media content over a secondary transport stream to the subscriber.

8. The service provider server of claim 1, wherein the plurality of instructions, when executed by the processor, configures the processor to broadcast the plurality of media content over the plurality of primary transport streams to the plurality of subscribers.

9. A method, comprising:
   providing, by a service provider system, a plurality of media content over a plurality of primary transport streams to a plurality of subscribers;
   storing, by the service provider system, an exclusive copy of a media content from among the plurality of media content into an exclusive region from among a plurality of exclusive regions for storing media content in response to a subscriber from among the plurality of subscribers selecting a primary transport stream from among the plurality of primary transport streams having the media content, the exclusive region being associated with only the subscriber and being exclusively accessible by only the subscriber;
   flushing, by the service provider system, the exclusive region to erase the exclusive copy from the exclusive region in response to the subscriber selecting a different primary transport stream from among the plurality of primary transport streams having different media content from among the plurality of media content; and storing, by the service provider system, an exclusive copy of the different media content into the exclusive region in response to the subscriber selecting the different primary transport stream.

10. The method of claim 9, further comprising receiving an authorization from the subscriber to copy the media content on behalf of the subscriber.

11. The method of claim 9, further comprising setting a logical playback marker that is associated with the exclusive copy of the different media content in response to receiving a first command from the subscriber to perform a trick playback mode on the different media content.

12. The method of claim 11, further comprising advancing or retreating the logical playback marker in time in response to the trick playback mode.

13. The method of claim 11, further comprising retrieving the exclusive copy of the different media content starting from the logical playback marker in response to receiving a second command from the subscriber to resume streaming of the different media content.

14. The method of claim 9, further comprising retrieving the exclusive copy of the different media content in response to a command from the subscriber to perform a trick playback mode on the different media content.

15. The method of claim 14, further comprising unicasting the exclusive copy of the different media content over a secondary transport stream to the subscriber.

16. The method of claim 9, wherein the providing comprises broadcasting the plurality of media content over the plurality of primary transport streams to the plurality of subscribers.

17. A service provider system, comprising:
a storage including a plurality of exclusive regions for storing media content, each exclusive region from among the plurality of exclusive regions being associated with a corresponding subscriber from among a plurality of subscribers and being exclusively accessible by only the corresponding subscriber; and
a server configured to:
provide a plurality of media content over a plurality of primary transport streams to the plurality of subscribers,
store an exclusive copy of a media content from among the plurality of media content into an exclusive region from among the plurality of exclusive regions for storing media content in response to a subscriber from among the plurality of subscribers selecting a primary transport stream from among the plurality of primary transport streams having the media content,
flush the exclusive region to erase the exclusive copy from the exclusive region in response to the subscriber selecting a different primary transport stream from among the primary transport streams having different media content from among the plurality of media content, and
store an exclusive copy of the different media content into the exclusive region in response to the subscriber selecting the different primary transport stream.

18. The service provider system of claim 17, wherein the server is further configured to receive an authorization from the subscriber to copy the media content on behalf of the subscriber.

19. The service provider system of claim 17, wherein the server is further configured to set a logical playback marker that is associated with the exclusive copy of the different media content in response to receiving a first command from the subscriber to perform a trick playback mode on the different media content.

20. The service provider system of claim 19, wherein the server is further configured to retrieve the exclusive copy of the different media content starting from the logical playback marker in response to receiving a second command from the subscriber to resume streaming of the different media content.

* * * * *